March 11, 1924.

C. A. ROSS

VALVE

Filed May 7, 1920  2 Sheets-Sheet 1

1,486,303

INVENTOR
Charles A. Ross
BY
ATTORNEYS

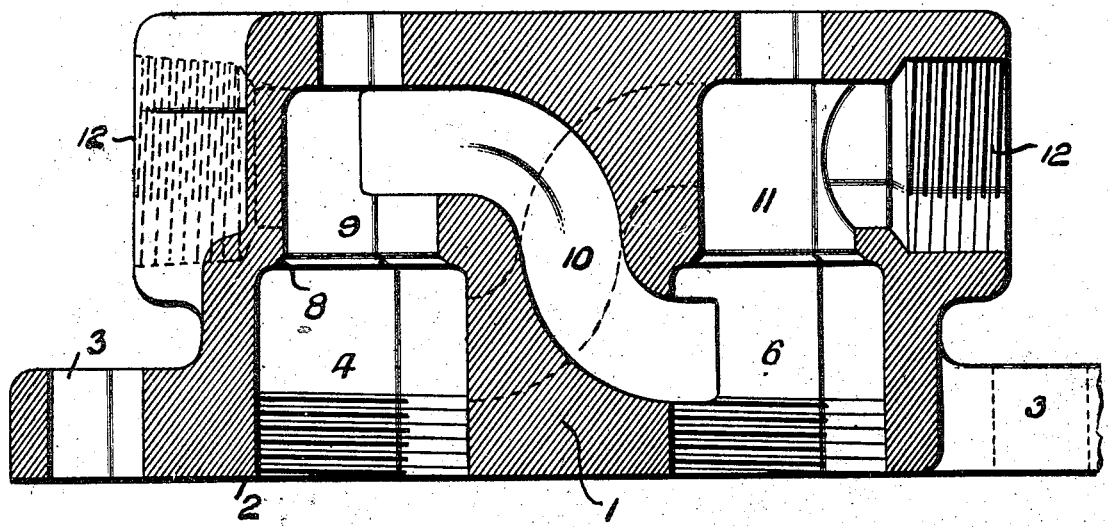
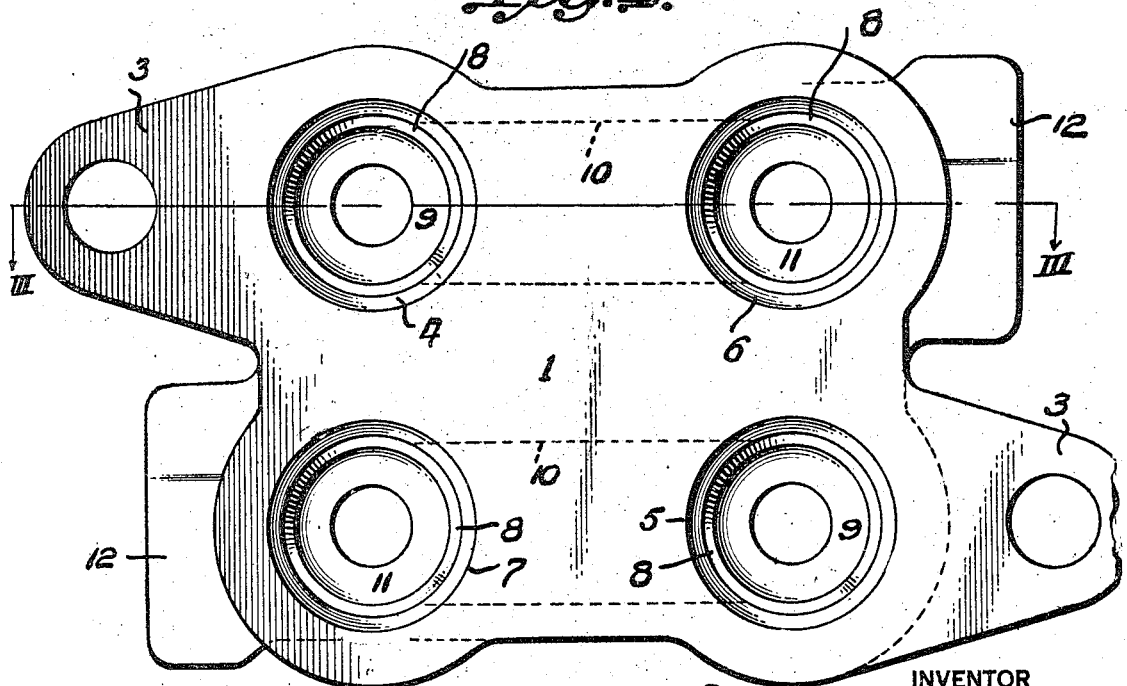

Patented Mar. 11, 1924.

1,486,303

UNITED STATES PATENT OFFICE.

CHARLES A. ROSS, OF DETROIT, MICHIGAN.

VALVE.

Application filed May 7, 1920. Serial No. 379,510.

*To all whom it may concern:*

Be it known that I, CHARLES A. ROSS, a citizen of the United States of America, residing at Detroit, in the county of Wayne and State of Michigan, have invented certain new and useful Improvements in Valves, of which the following is a specification, reference being had therein to the accompanying drawings.

This invention relates to valves and has special reference to what is commonly known as a "two-way" valve that may be advantageously used for controlling fluids, and liquids under pressure, especially air under pressure supplied by an air compressor or reservoir and adapted to be utilized as a motive power, for instance in a cylinder for moving a piston therein to accomplish work.

The primary object of my invention is to provide a quick acting two-way valve wherein the valvular means is disposed to permit of air, under pressure, passing through the valve to one end of a cylinder and air exhausting through the valve from the opposite end of the cylinder. The arrangement of valves is such that the air under pressure will clean the valve seats when the valves are open and assist in maintaining the valves seated or closed.

A further object of my invention is to provide a simple, durable and reliable valve wherein springs are employed to insure a positive and quick action of the valve, so that an operator of the valve cannot unintentionally retard its action, but by successive actions of the valve intentionally operate the same to move a piston in a cylinder a desired speed. In other words, the valve is either open or closed and in consequence of a quick action it is possible to positively control the use of air as a motive fluid.

The above and other objects are attained by a mechanical construction that will be hereinafter considered and then claimed, and reference will now be had to the drawings, wherein Figure 1 is a longitudinal sectional view of the valve structure;

Fig. 3 is a longitudinal sectional view of the valve body; and

Fig. 4 is a plan of the same.

Figure 1:
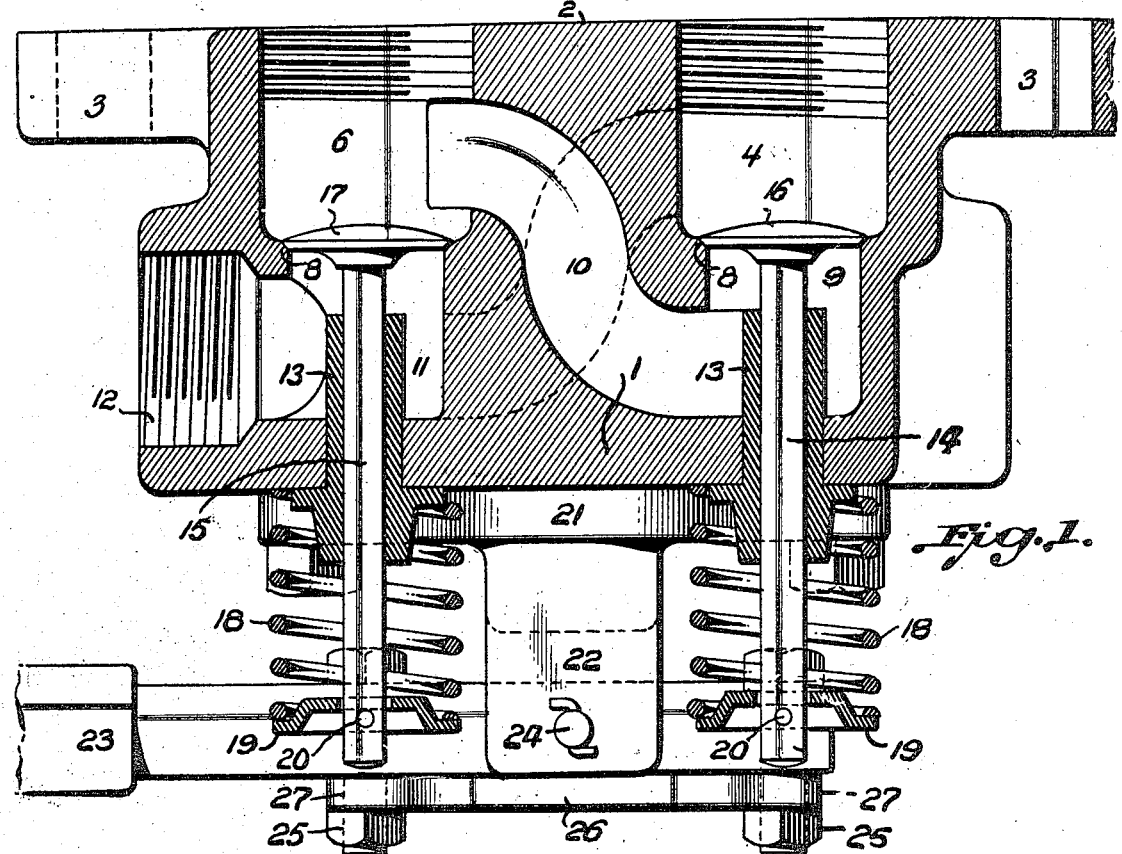
Figure 2:
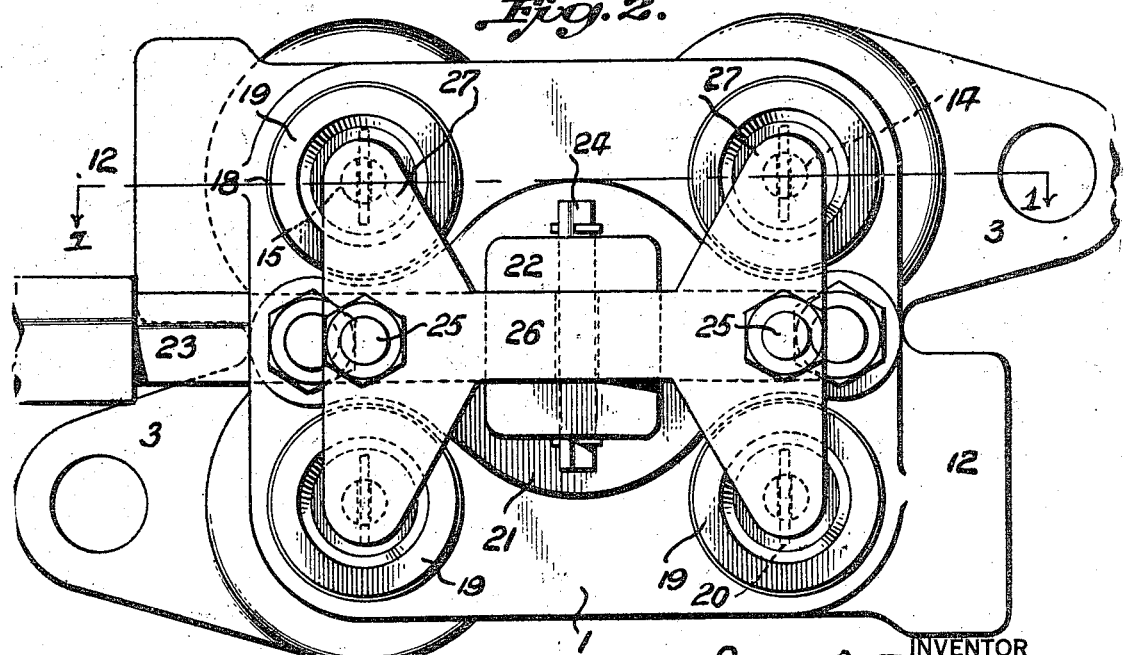
Fig. 2 is a plan of the same.

The valve comprises substantially a rectangular body 1 having a flat face 2 and end lateral apertured lugs 3 so that the body may be suitably secured to a suitable support. In the flat face 2 of the body 1 are intake chambers 4 and 5 and outlet chambers 6 and 7, the chambers 4 and 7 being at one end of the body and the chambers 5 and 6 at the opposite end of the body, with the chambers 4 and 6 in a vertical plane parallel to the vertical plane of the chambers 5 and 7, considering the valve body in an upright position as shown in Fig. 1. The walls of the chambers 4 to 7 inclusive may be screwthreaded to receive intake and outlet connections, and the bottom of each chamber has a valve seat 8. The valve seats of the intake chambers 4 and 5 communicate with passages 9 which are in communication with compound curved or ogee ports 10 communicating with the outlet chambers 6 and 7, the ports 10 being in parallel planes and establishing communication between the inner ends of the intake chambers 4 and 5 and the outer ends of the outlet chambers 6 and 7.

The valve seats 8 of the outlet chambers 6 and 7 communicate with exhaust chambers 11 having exhaust openings 12 with the walls thereof screwthreaded for suitable exhaust connections.

Extending into the exhaust chambers 11 and into the passages 9 are bushings 13 for valve rods 14 and 15 having valves 16 and 17 respectively with the valves 16 engaging the seats 8 of the intake chamber 4 and the outlet chamber 7 and the valve 17 engaging the seats 8 of the intake chamber 5 and the outlet chamber 6. The bushings 13 afford guides for the rods 14 and 15 and thimbles for coiled expansion springs 18 surrounding the outer ends of the rods 14 and 15 against spring retaining washers or abutments 19 retained on the rods 14 and 15 by pins 20 or similar retaining means, the springs 18 being constantly under tension, so that the valves 16 and 17 will be seated or closed.

Suitably attached to the valve body 1 is the base or foot 21 of a bifurcated bearing or post 22 and in the bifurcation or groove of said bearing is fulcrumed an operating lever 23, said lever being supported on a transverse pin 24 in the bearing 22. The operating lever 23 is in a plane intermediate the longitudinal parallel planes of the valve rods 14 and 15 and suitably attached to said rods 14 and 15, as at 25, is a rocker head 26 which is substantially H shaped in plan so that its wings or legs 27 will extend over or under the outer ends of the valve rods 14 and 15 and be in position to actuate said valve rods when the operating lever 26 is oscillated.

Considering the operation of the valve and assuming that it is connected to a suitable source of air under pressure and to the ends of a cylinder containing a piston adapted to be reciprocated by air pressure, oscillation of the operating lever 26 in one direction causes the valve rods 15 to remain stationary and the valve rods 14 to be actuated, and oscillation of the operating lever in the opposite direction causes the valve rods 14 to remain stationary and the valve rods 15 to be actuated. Assuming that the valve rods 14 are actuated the valves 16 thereof are opened or unseated. Air entering the intake chamber 4 passes through the passage 9 and the outlet port 10 to the outlet chamber 6 from where it may enter the end of the cylinder to perform work against one side of the piston to move the piston; the air at the opposite side of the piston exhausting through the outlet chamber 7 into the exhaust chamber 11, by reason of the valves 16 being open to establish communication between the outlet chamber and the exhaust chamber.

The supply of air to the intake chamber 5 may be controlled in a similar manner by the valves 17 and the exhaust by the valve in the outlet chamber 6, thus permitting one set of valves to cooperate in effecting a movement of the piston in one direction and the other set of valves to cooperate in effecting a movement of the piston in the opposite direction.

I attach considerable importance to the tappet arrangement of the valve, as it is practically impossible for a workman to carelessly retard the action of the valve. There is a positive open and shut movement of the valve with the pressure of air on the closed valves cooperating with the expansive force of the springs in maintaining the valves closed and it is apparent that when the valves are open that the release of air cleans the valve seats and prevents the accummulation of foreign matter which might cause leakage at the valve seats when the valves are seated.

What I claim is:—

1. A valve of the type described comprising a rectangular body, having an intake chamber and an outlet chamber in each side portion thereof so that the arrangement of said chambers places the intake chambers in diagonal relation and the outlet chambers in diagonal relation, said body having ports disposed in parallel planes with each port connecting an intake chamber to an outlet chamber, said body having exhaust chambers adapted to be placed in communication with said outlet chambers, valves controlling the communication between the intake, outlet and exhaust chambers, means maintaining said valves normally closed, and operating means adapted for opening said valves.

2. A valve of the type described comprising a rectangular body, having an intake chamber and an outlet chamber in each side portion thereof so that the arrangement of said chambers places the intake chambers in diagonal relation and the outlet chambers in diagonal relation, said body having ports disposed in parallel planes with each port connecting an intake chamber to an outlet chamber, said body having exhaust chambers adapted to be placed in communication with said outlet chambers, sets of tappet valves controlling the passage of motive fluid through all of said chambers, and operating means adapted for alternately opening sets of said tappet valves.

3. A valve of the type described comprising a rectangular body having an intake chamber and an outlet chamber in each side portion thereof so that the arrangement of said chambers places the intake chamber in diagonal relation and the outlet chambers in diagonal relation, said body having ports disposed in parallel planes with each port connecting an intake chamber to an outlet chamber, said body having exhaust chambers adapted to be placed in communication with said outlet chambers, tappet valves controlling the passage of motive fluid through the chambers of said body, means maintaining said valves normally closed, and means common to all of said valves adapted for alternately opening said valves.

In testimony whereof I affix my signature in the presence of two witnesses.

CHARLES A. ROSS.

Witnesses:
ANNA M. DORR,
KARL H. BUTLER.